(12) United States Patent
Habetha et al.

(10) Patent No.: US 9,370,033 B2
(45) Date of Patent: Jun. 14, 2016

(54) METHOD FOR DERECT COMMUNICATION BETWEEN A FIRST STATION AND A SECOND STATION OF A WIRELESS NETWORK

(75) Inventors: Jörg Habetha, Aachen (DE); Guido Hiertz, Köln (DE); Klaus Peter May, Aachen (DE); Olaf Wischhusen, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 3243 days.

(21) Appl. No.: 10/595,799

(22) PCT Filed: Nov. 15, 2004

(86) PCT No.: PCT/IB2004/052430
§ 371 (c)(1),
(2), (4) Date: Feb. 26, 2007

(87) PCT Pub. No.: WO2005/050919
PCT Pub. Date: Jun. 2, 2005

(65) Prior Publication Data
US 2007/0242665 A1    Oct. 18, 2007

(30) Foreign Application Priority Data
Nov. 20, 2003    (EP) .................................. 03104290

(51) Int. Cl.
| | |
|---|---|
| *H04W 4/00* | (2009.01) |
| *H04W 76/02* | (2009.01) |
| *H04W 8/26* | (2009.01) |
| *H04W 72/02* | (2009.01) |
| *H04W 92/18* | (2009.01) |

(52) U.S. Cl.
CPC .......... *H04W 76/023* (2013.01); *H04W 76/021* (2013.01); *H04W 8/26* (2013.01); *H04W 72/02* (2013.01); *H04W 92/18* (2013.01)

(58) Field of Classification Search
USPC ................. 370/255, 338, 475, 389, 311, 315; 455/550.1–575.9
See application file for complete search history.

(56) References Cited

U.S. PATENT DOCUMENTS 5,740,160 A * 4/1998 Ikegami et al. ................ 370/255
5,949,776 A * 9/1999 Mahany et al. ................ 370/338
(Continued)

FOREIGN PATENT DOCUMENTS

| | | |
|---|---|---|
| EP | 1274194 | 1/2003 |
| EP | 1309128 | 5/2003 |

(Continued)

*Primary Examiner* — Shahriar Behnamian
(74) *Attorney, Agent, or Firm* — Larry Liberchuk

(57) ABSTRACT

In an Access Point controlled wireless network, wherein one channel communication is ruled by an identifier associated with the Access Point, a method for direct communication between a first station and a second station, includes generating a second identifier by the first station, different from the identifier associated with the Access Point, and optionally choosing a different channel; sending, by the first station, an invitation message for direct communication carrying the second identifier and optionally the second channel to the second station; sending, by the second station, a response message acknowledging the invitation message; setting up direct communication between the first station and the second station using the second identifier and optionally the second channel.

12 Claims, 1 Drawing Sheet

(56) References Cited

U.S. PATENT DOCUMENTS

| | | | |
|---|---|---|---|
| 6,321,095 B1* | 11/2001 | Gavette | 455/517 |
| 6,480,525 B1* | 11/2002 | Parsa et al. | 375/141 |
| 6,483,852 B1* | 11/2002 | Jacquet et al. | 370/466 |
| 6,580,704 B1* | 6/2003 | Wellig et al. | 370/338 |
| 6,718,159 B1* | 4/2004 | Sato | 455/11.1 |
| 6,804,209 B1* | 10/2004 | Sugaya et al. | 370/328 |
| 2002/0061009 A1* | 5/2002 | Sorensen | 370/351 |
| 2002/0114286 A1* | 8/2002 | Iwamura et al. | 370/252 |
| 2003/0125074 A1* | 7/2003 | Tanada et al. | 455/552 |
| 2003/0231608 A1* | 12/2003 | Wentink | 370/338 |
| 2004/0097199 A1* | 5/2004 | Kawamura et al. | 455/91 |

FOREIGN PATENT DOCUMENTS

| | | |
|---|---|---|
| EP | 1324550 | 7/2003 |
| JP | 2003198672 | 7/2003 |

\* cited by examiner

My inputer# METHOD FOR DERECT COMMUNICATION BETWEEN A FIRST STATION AND A SECOND STATION OF A WIRELESS NETWORK The invention relates to a method for direct communication between a first station and a second station in an Access Point controlled wireless network, wherein one channel communication is ruled by an identifier associated with the Access Point.

In an Independent Basic Service Set (IBSS), defined for example in the IEEE 802.11 standard, all communicating stations communicate directly to each other. In an infrastructure Basic Service Set (BSS), all stations associated to a common Access Point (AP) communicate via this Access Point. Therefore, in such a BSS, all data are sent twice, since the first station sends its data to the Access Point whereupon the Access Point must forward all data of the first station destined for the second station, as no direct communication is possible. This fact reduces the overall throughput of the BSS and increases delay. Existing Access Points are not able to allow direct communication between their associated stations. An upgrade of the software of the Access Point to incorporate direct communication is sometimes not possible or desirable, for example in the case that an Access Point base is already installed.

A method to allow communication between two stations is disclosed in WO 01/15387.

It is object of the invention to provide for direct station-to-station communication in a centrally organized network that does not require any changes in the Access Point.

This object is solved by a method as defined in claim 1 and a network as defined in claim 9.

In an Access Point controlled wireless network, wherein one channel communication is ruled by an identifier associated with the Access Point, a method for direct communication between a first station and a second station according to the invention comprises the steps of:—generating a second identifier by said first station, different from the identifier associated with the Access Point, and optionally choosing a second channel;—sending, by said first station, an invitation method for direct communication carrying said second identifier to said second station;—sending, by said second station, a response message acknowledging the invitation message;—setting up direct communication between said first station and said second station using said second identifier.

The invention therefore foresees that stations which want to communicate directly use a special network identifier and optionally a different channel for that purpose. The stations agree upon this special network identifier and the channel by a hand-shake message exchange prior to the direct communication. The Access Point, which does not know the special network identifier, will interpret the direct data packets as belonging to a foreign network and will refrain from forwarding the data. When communicating with another station in the infrastructure-based network, a station always uses the infrastructure BSS identifier, but when communicating directly with a station, the second identifier is used.

The invitation message and said response message can be sent via the Access Point using the identifier associated therewith. An alternative is to exchange said invitation message and said response message directly between said first station and said second station using an identifier different from the identifier associated with the Access Point.

The response message may contain information that said second identifier is confirmed or that said second identifier is rejected and a third identifier is proposed. This third identifier is again different from the identifier associated with the Access Point.

For direct communication between stations, a dedicated identifier may be created.

Optionally, the response message may contain information the proposed channel is confirmed or that the channel is rejected and a different channel is proposed.

Even though the two types of communication might operate on the same communication channel, they should not collide if carrier sensing is applied. If two communications with different identifiers do collide, a collision resolution has to be applied. An example for such a protocol is the IEEE 802.11 standard. Therefore, the invention is very well suited for such system.

The invention will be explained in further detail with reference to the accompanying drawings, wherein FIG. 1 illustrates a first embodiment of the invention to establish direct communication between two stations of an infrastructure based network as initiated from a first station;

Figure 1:
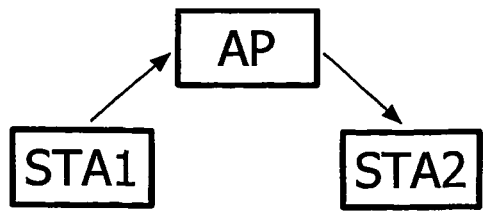

In FIG. 1, two stations STA1 and STA2 are associated to the Access Point AP of an infrastructure-based Basic Service Set BSS. The BSS identifier equals the MAC address of Access Point AP. When stations STA1 and STA2 want to set up a directing connection, they have to agree upon the identifier and optionally a different channel for their communication. To do this, station STA1 sends an invitation frame or invitation message to the Access Point AP, where the invitation message includes all necessary information for the intended side traffic which then avoids involvement of the Access Point AP. The Access Point AP copies the message and forwards it to stations STA2.

Figure 2:
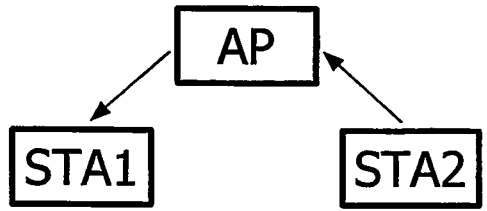
FIG. 2 illustrates the acknowledgement of an invitation by a second station.

As shown in FIG. 2, station STA2, upon receipt of the invitation message, sends a response message to the Access Point AP acknowledging the invitation, confirming the identifier and channel for direct communication. Optionally, station STA2 rejects a proposed identifier and/or channel and proposes a new identifier and/or channel to station STA1, where again the identifier has to be different from the identifier associated with the Access Point AP. Again optionally, station STA2 can also propose an identifier and/or channel for further direct communication. The response message is forwarded by the Access Point AP to station STA1.

Figure 3:
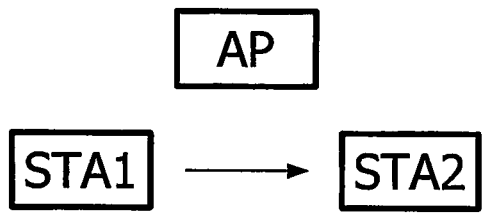
FIG. 3 illustrates a second embodiment of the invention, where direct communication is established without involvement of the Access Point.
Figure 4:
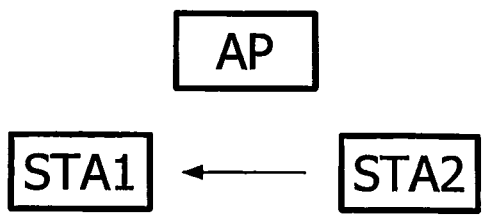
FIG. 4 illustrates the acknowledgement of the invitation received from a first station by the second station.

FIG. 3 shows a second embodiment wherein station STA1 invites station STA2 to the direct communication by using a special identifier, preferably the second identifier, and optionally a second channel, and sends the invitation frame via a side traffic. This invitation message may or may not include a proposal for another identifier and/or channel for further direct communication. If the second identifier is a dedicated identifier, station STA2 will recognize that the invitation message is a direct link message and send, as illustrated in FIG. 4, the response message directly to the station STA1 without involving Access Point AP.

In both embodiments, station STA1 and station STA2 agree upon a BSS identifier that is different from the one of the infrastructure based network. In case that station STA2 has already agreed on an identifier and channel with still another station, station STA2 may propose to use this identifier and channel also for communication with station STA1.

After successful agreement on direct communication, the initiating station STA1 has to test the link. Station STA1 then established the direct communication via a successfully transmitted frame.

Figure 5:
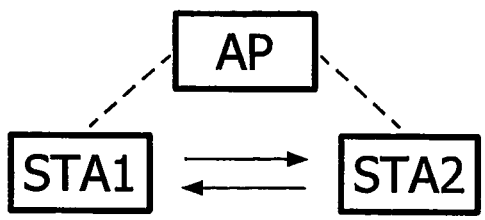
FIG. 5 illustrates a successful direct communication between two stations.

FIG. 5 shows that station STA1 and STA2 have successfully established direct communication using the second identifier and optionally the second channel. Station STA1 and station STA2 are still associated to the Access Point AP, and when communicating via Access Point AP, they will use the identifier and channel associated therewith. Principally, all stations participating in the Access Point controlled wireless network can have one or several direct connections owing to the fact that each sub-network refrains from communication during the active intervals of the other network.

The invention claimed is:

1. A method for direct communication between a first station and a second station in an Access Point controlled wireless network, wherein a communication channel is ruled by an identifier associated with the Access Point, comprising:
   generating a second identifier by said first station, the second identifier different from the identifier associated with the Access Point;
   sending, by said first station to the second station, an invitation message for direct communication carrying said second identifier;
   sending, by said second station, a response message acknowledging the invitation message; and
   setting up direct communication between said first station and said second station using said second identifier, wherein the first station and the second station are different from the Access Point.

2. The method according to claim 1, wherein said invitation message and said response message are sent via the Access Point using the identifier associated with the Access Point.

3. The method according to claim 1, wherein said invitation message and said response message are exchanged directly between said first station and said second station using the second identifier different from the identifier associated with the Access Point.

4. The method according to claim 1, wherein said response message contains information that said second identifier is confirmed or that said second identifier is rejected and a third identifier is proposed, wherein said third identifier is different from the identifier associated with the Access Point.

5. The method according to claim 1, wherein said second identifier is a dedicated identifier for direct communication between stations.

6. The method according to claim 1, wherein carrier sensing is applied to avoid collision on said communication channel ruled by an identifier associated with the Access Point.

7. Use of the method according to claim 1 in the communication protocol of the IEEE 802.11 standard.

8. The method according to claim 1, wherein the first station chooses the first communication channel or a second communication channel, different from the first communication channel, for direct communication with the second station, and when the second communication channel is chosen, the first station sends an indication of the second communication channel to the second station.

9. The method according to claim 8, wherein said response message contains information that said second channel is confirmed or that said second channel is rejected and the channel which is associated with the Access Point or a third channel is proposed.

10. An access point controlled wireless network, wherein a first communication channel is ruled by an identifier associated with the access point, said wireless network comprising:
    at least a first station and a second station capable of establishing direct communication, wherein:
    said first station generates a second identifier, the second identifier different from the identifier associated with the access point, and sends an invitation message for direct communication carrying said second identifier to the second station; said second station sends a response message acknowledging the invitation message; and said first station sets up direct communication with said second station using said second identifier, wherein the first station and the second station are different from the access point.

11. The wireless network of claim 10, wherein the first station chooses the first communication channel or a second communication channel, different from the first communication channel, for direct communication with the second station, and when the second communication channel is chosen, the first station sends an indication of the second communication channel to the second station.

12. The wireless network of claim 11, wherein, when the second station receives an indication of the second communication channel, the response message contains information that the second communication channel is confirmed or that the second communication channel is rejected and the first communication channel which is associated with the access point or a third communication channel is proposed.

* * * * *